United States Patent
Haran et al.

(10) Patent No.: US 10,310,636 B2
(45) Date of Patent: Jun. 4, 2019

(54) ACTIVE STYLUS

(71) Applicant: Microsoft Technology Licensing, LLC, Redmond, WA (US)

(72) Inventors: On Haran, Kfar Saba (IL); Vadim Mishalov, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 15/343,681

(22) Filed: Nov. 4, 2016

(65) Prior Publication Data

US 2018/0129310 A1 May 10, 2018

(51) Int. Cl.
| | |
|---|---|
| *G06F 3/033* | (2013.01) |
| *G06F 3/0354* | (2013.01) |
| *G06F 3/0346* | (2013.01) |
| *G06F 3/038* | (2013.01) |
| *G06F 3/041* | (2006.01) |

(52) U.S. Cl.
CPC ........ *G06F 3/03545* (2013.01); *G06F 3/0346* (2013.01); *G06F 3/0383* (2013.01); *G06F 3/041* (2013.01); *G06F 2203/04105* (2013.01)

(58) Field of Classification Search
CPC .... G06F 3/03545; G06F 3/0383; G06F 3/041; G06F 3/0346; G06F 3/0354; G06F 3/038; G06F 2203/04105
See application file for complete search history.

(56) References Cited

U.S. PATENT DOCUMENTS

| | | | |
|---|---|---|---|
| 6,577,299 B1 | 6/2003 | Schiller et al. | |
| 7,342,350 B2 | 3/2008 | Toda | |
| 7,656,370 B2 * | 2/2010 | Schneider | G09G 3/3233 345/204 |
| 8,638,320 B2 | 1/2014 | Harley et al. | |
| 9,122,322 B2 | 9/2015 | Stern et al. | |
| 9,164,618 B2 | 10/2015 | Perski et al. | |
| 9,298,285 B2 | 3/2016 | Mohindra et al. | |
| 9,323,368 B2 | 4/2016 | Zachut | |
| 9,477,330 B2 * | 10/2016 | Stern | G06F 3/0418 |
| 2012/0327042 A1 | 12/2012 | Harley et al. | |
| 2013/0106717 A1 | 5/2013 | Sundara-Rajan et al. | |
| 2014/0028635 A1 | 1/2014 | Krah | |

(Continued)

FOREIGN PATENT DOCUMENTS

| | | |
|---|---|---|
| WO | 2014130355 A2 | 8/2014 |
| WO | 2016004003 A1 | 1/2016 |

OTHER PUBLICATIONS

"International Search Report and Written Opinion Issued in PCT Application No. PCT/US2017/058923", dated Feb. 1, 2018, 12 Pages.

(Continued)

*Primary Examiner* — Vijay Shankar (74) *Attorney, Agent, or Firm* — Holzer Patel Drennan (57) ABSTRACT

A handheld device for use with a digitizer sensor includes a writing tip, an integrated circuit configured to generate a signal, a first electrode separated from the writing tip along a longitudinal axis of the handheld device, and a relative angle detection element configured to provide information for determining an angle of the handheld device relative to the digitizer sensor. The first electrode is electrically coupled to the integrated circuit and configured to transmit the signal to the digitizer sensor.

20 Claims, 5 Drawing Sheets

(56) References Cited

U.S. PATENT DOCUMENTS

| | | |
|---|---|---|
| 2014/0146021 A1 | 5/2014 | Trethewey et al. |
| 2014/0165742 A1 | 6/2014 | Fergusson et al. |
| 2014/0306929 A1 | 10/2014 | Huang et al. |
| 2015/0070330 A1 | 3/2015 | Stern |
| 2015/0123923 A1* | 5/2015 | Stern .................... G06F 3/0418 345/173 |
| 2015/0301714 A1 | 10/2015 | Rimon et al. |
| 2015/0309598 A1 | 10/2015 | Zeliff et al. |
| 2015/0346847 A1 | 12/2015 | Zachut |
| 2015/0346890 A1 | 12/2015 | Zachut |
| 2015/0370354 A1 | 12/2015 | Stern et al. |
| 2016/0124530 A1 | 5/2016 | Stern |
| 2016/0162051 A1 | 6/2016 | Peretz et al. |
| 2016/0274700 A1 | 9/2016 | Mishalov |
| 2016/0313812 A1 | 10/2016 | Katsurahira |

OTHER PUBLICATIONS

Lee, et al., "Haptic Pen: A Tactile Feedback Stylus for Touch Screens", In Proceedings of the 17th annual ACM symposium on User interface software and technology, vol. 6, Issue 2, Oct. 24, 2004, pp. 291-294.

Haran, On, "Technologies and Requirements for Digital Pens", In Information Display, Official Monthly Publication of the Society for Information Display, vol. 3, No. 4, Jul./Aug. 2014, pp. 6-11.

Barel, Eliyahu, "Pressure Sensitive Stylus", U.S. Appl. No. 14/848,527, filed Sep. 9, 2015, 31 pages.

Barel, Eliyahu, "Active Pencil and Transmitter", U.S. Appl. No. 14/849,943, filed Sep. 10, 2015, 26 pages.

Winebrand, Emil, "Pen Location Detection", U.S. Appl. No. 15/062,129, filed Mar. 6, 2016, 30 pages.

Zyskind, Amir, "Pen in Field Force Sensing Calibration" U.S. Appl. No. 15/062,124, filed Mar. 6, 2016, 23 pages.

Winebrand, et al., "Soft Touch Detection of a Stylus" U.S. Appl. No. 15/062127, filed Mar. 6, 2016, 24 pages.

Barel, Eliyahu, "Stylus With an Adjustable Dimension" U.S. Appl. No. 15/070,091, filed Mar. 15, 2016, 23 pages.

Peretz, et al., "Pressure Sensitive Stylus" U.S. Appl. No. 15/133,521, filed Apr. 20, 2016, 30 pages.

* cited by examiner

ACTIVE STYLUS

BACKGROUND

Touch-sensor-integrated pens interact with a grid of capacitive-touch electrodes that exist below an electronic display. A touch-sensor-integrated pen can be further classified as a passive stylus or an active stylus (e.g., an active pen).

The passive stylus utilizes sensing methods based on changes in the capacitive coupling between sensor electrodes deposited on a touch-screen sensor and an input object, such as a rubber-tipped stylus or human figure. For example, electrical signals are driven on a set of conductive transparent electrodes deposited on one axis of the touch-screen sensor, while synchronized sensing of electrical signals takes place on a perpendicular set of electrodes. While a passive stylus can work well for human-touch detection, this solution may be less effective when fine tip pens are used. Also, challenges exist in distinguishing a passive stylus from fingernails and other fine user touches.

In contrast, active styluses drive unique modulated signals from the tip of the stylus to a grid of electrodes (e.g., a digitizer) and utilize sensing methods based on changes in the capacitive coupling between sensor electrodes. In these devices, sensing may take place on both axes simultaneously, with the received magnitudes being proportional to the tip proximity to the electrodes. Some active styluses may work in conjunction with a display that also supports touch-sensing. For example, the modulated content-rich signals of the active styluses may be received orthogonal to the touch-signals to facilitate differentiation between passive sensing and touch-sensing.

SUMMARY

Implementations described and claimed herein provide a handheld device configured for use with a digitizer sensor. The handheld device includes an integrated circuit configured to generate a signal, an electrode configured to transmit the signal to the digitizer sensor, and a relative angle detection element to provide position information for determining an angle of the handheld device relative to the digitizer sensor. The electrode is separated from the writing tip along a longitudinal axis of the handheld device.

According to another implementation, a method disclosed herein provides for detecting first input at one or more receiving electrodes of a digitizer sensor included in an electronic display. The first input is transmitted by a first signal-emitting electrode of a handheld device that is separated from a writing tip of the handheld device by a distance along a longitudinal axis of the handheld device. The method further provides for detecting second input from a relative angle detection element of the handheld device, and for calculating a position of the writing tip of the handheld device relative to the digitizer sensor based on a position of the one or more receiving electrodes of the digitizer sensor and the second input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Some electronic computing devices include a display with a built-in digitizer to sense signals transmitted from a handheld device, such as an active stylus or other signal-emitting device accessory. In these electronic devices, a user interacts with the digitizer system by positioning and moving the handheld device over a sensing surface of the system, e.g., a tablet and/or a touch screen. The position of the handheld device with respect to the sensing surface is tracked by the digitizer system and interpreted as a user command. In some technologies, position of the handheld device can be determined based on detection of an capacitive coupling between an electrode of the handheld device and one or more electrodes of the digitizer. For example, the device display may include a digitizer with a plurality of X and Y oriented conductors or a resistive film to receive signals transmitted from the electrode of the active pen. To accurately identify tip position, the transmitting electrode is, in some technologies, physically positioned within a writing tip of the handheld device.

Electrode placement within the tip of the handheld device (e.g., the active stylus) causes a number of complications, such as complications related to the development of architecture for driving an electrical signal to the writing tip and related to implementing signal variations to support differently-shaped replaceable tips, which are included in some active styluses on the market today. In addition to these shortcomings, an active stylus with a conductive writing tip may cause an audible "tapping noise" when coming into contact with the device display that some users find unpleasant. To address the foregoing, the herein-disclosed technology provides a digitizer sensing system that works in in conjunction with an active stylus (or other signal-transmitting handheld device) that does not have an electrode positioned in the writing tip. The absence of signal-emitting components in the writing tip provides for greater design flexibility. For example, the writing tip of the active stylus may assume a number of different shapes and sizes and/or be interchangeably replaced by a user without disrupting the electrical components used to generate and transmit a position signal to the digitizer sensor.

Figure 1:
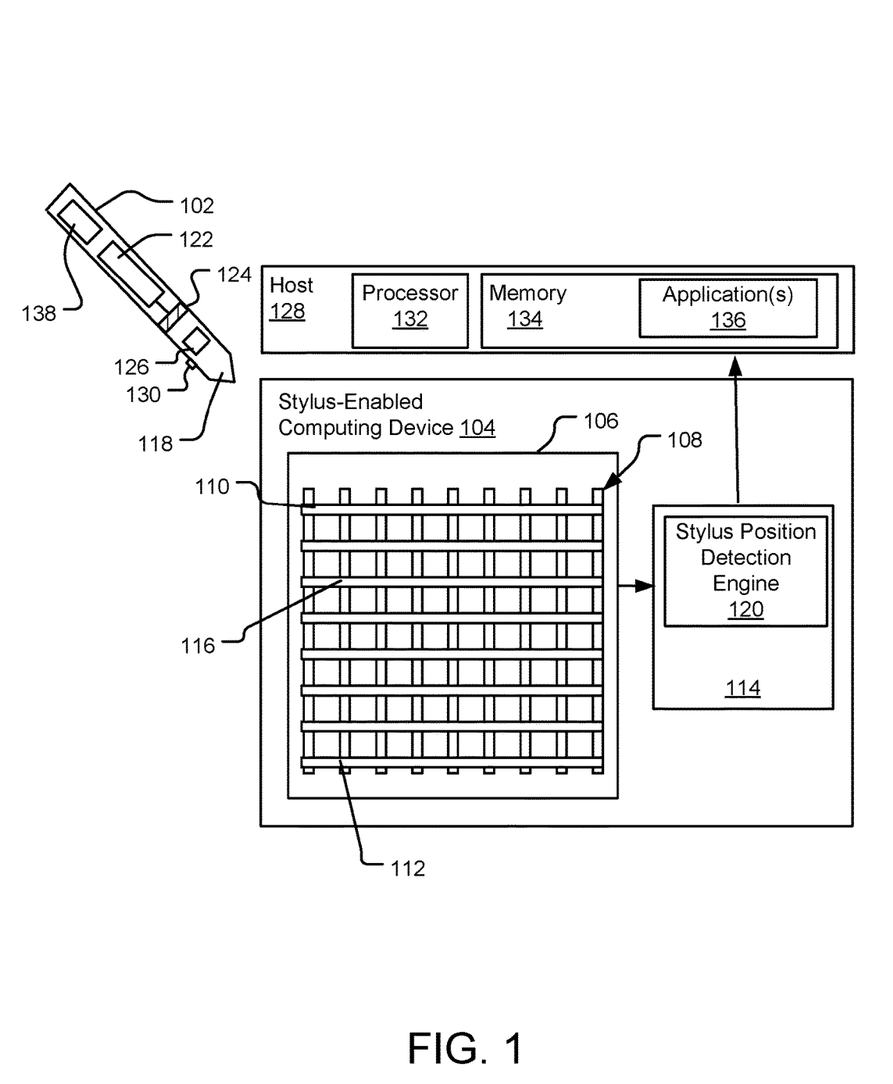
FIG. 1 illustrates an example system including a stylus and stylus-enabled computing device.

FIG. 1 illustrates an example system 100 including a stylus 102 and a stylus-enabled computing device 104. The stylus-enabled computing device 104 includes a display 106 that is integrated with a digitizer sensor 108 including column conductive strips 112 and row conductive strips 110.

The row conductive strips 110 and column conductive strips 112 are electrically coupled to a circuit 114 and operative to detect an electromagnetic signal emitted by the stylus 102. In some implementations, the conductive strips are further operative to detect an input from a human finger, hand, or other objects. For example, the row conductive strips 110 and column conductive strips 112 may each be electrically insulated from one another to form a grid-based capacitive sensor. The row conductive strips 110 and column conductive strips 112 are, in one implementation, arranged to enhance capacitive coupling between the row conductive strips 110 and the column conductive strips 112, such as around junctions 116 formed between row conductive strips 110 and column conductive strips 112. The capacitive coupling is, for example, sensitive to the presence of conductive objects, such as fingertips. In other implementations, the digitizer sensor 108 is formed with a matrix of electrode junctions 116 that are not constructed based on rows and columns of conductive strips.

The circuit 114 manages and controls stylus-based detection and, in applicable implementations, finger based detection. Together, the digitizer sensor 108 and the circuit 114 form a digitizer system. During stylus-based detection, output from both the row conductive strips 110 and the column conductive strips 112 are sampled to detect a signal transmitted by the stylus 102 and to determine the coordinates of a writing tip 118 of the stylus 102 relative to the digitizer sensor 108. The circuit 114 includes a stylus position detection engine 120 that performs actions such as processing signals received by the stylus 102 and determining the coordinates of the writing tip 118.

The stylus 102 is also referred to herein as an "active stylus" because it includes electrical components, such as an integrated circuit (IC) 122 that controls generation of a signal transmitted by the stylus 102. For example, the IC 122 may encode information generated, stored, or sensed by the stylus 102 on the signal transmitted by the stylus 102. The IC 122 may, for example, include one or more application-specific integrated circuits ("ASICs"), one or more system on chips ("SOCs"), and/or one or more programmable intelligent computers ("PICs"), etc. In one implementation, the signal generated by the IC 122 is transmitted by one or more electrodes (e.g., an electrode 124) electrically coupled to the IC 122 and separated from the writing tip 118 along a primary (e.g., longitudinal) axis of the stylus 102. For example, the electrode may form part of an exterior surface of the stylus 102 that is electrically separated from the writing tip 118.

In operation, the electrode 124 is a signal-emitting electrode that transmits a position signal to the digitizer sensor 108. As described in greater detail below, the position signal can be used to identify a position of the writing tip 118 at a given point in time, even if there is no conductive material within the writing tip 118.

The electrode 124 may take on a variety of forms in different implementations. In one implementation, the electrode 124 is a conductive, annular-shaped component that forms a ring about an outer perimeter of the stylus 102. In another implementation, the electrode 124 is a conductive, annular-shaped component positioned inside an external housing of the stylus 102.

In some exemplary implementations, the stylus 102 operates by periodically transmitting a beacon signal that may be detected by the digitizer sensor 108. Synchronization between the stylus 120 and the circuit 114 (e.g., the stylus position detection engine 120) provides for matching sampling periods of the circuit 114 to transmission periods of the stylus 102. The stylus 102 may include one or more sensor(s) 126 for collecting and identifying various position and orientation information such as applied pressure, tilt, rotation, etc. For example, the stylus 102 may be pressure sensitive and include a pressure sensor among sensor(s) 126 for sensing pressure applied on the writing tip 118. In another implementation, the stylus 102 includes a tilt sensor among sensor(s) 126 for detecting a tilt of the stylus relative to the plane of the digitizer sensor 108.

Information collected by the sensor(s) 126 can be transmitted to the stylus-enabled computing device 104 in various ways. In one implementation, the IC 122 encodes information sensed by the sensor(s) 126 (e.g., pressure, tilt, etc.) onto the beacon signal. In another implementation, the stylus 102 transmits information sensed by the sensor(s) 126 transmitted on a separate burst signal. The stylus 102 may also periodically transmit other information related to the stylus 102, related to the environment around the stylus 102, to a user using the stylus 102, capabilities of the stylus 102, or information received from a third party device. Additional information related to the stylus may, for example, include indications of a pressed button(s) (e.g., a button 130), identification, manufacturer, version, media access control (MAC) address, and stored configurations such as color, tip type, brush, and-ons.

The stylus position detection engine 120 decodes information received from the stylus 102 to determine a current position of the writing tip 118 relative to X and Y coordinates of the digitizer sensor 108. In some implementations, other handheld devices are configured to interact with the digitizer sensor 108 and may be operated in a manner similar to the stylus 102 and tracked by the stylus position detection engine 120. Output from the circuit 114 is reported to a host 128, as shown. This output may include various information such as coordinates of the writing tip 118 of the stylus 102, orientation (e.g., pen-up or pen-down status) of the writing tip 118, pressure applied on the writing tip 118, and additional information provided by the stylus 102 (e.g., pressure, tilt, battery level, etc.) The circuit 114 may include one or more additional engines (not shown) for decoding and processing other types of information detected by the digitizer sensor 108, such as for decoding and processing 'touch' information detected when a user places a finger, hand, or other objects in near vicinity of the digitizer sensor 108.

The circuit 114 uses both analog and digital processing to process signals detected with the digitizer sensor 108. In other implementations, some and/or all of the functionalities of the stylus position detection engine 120 are performed by the host 128. The host 128 and/or stylus position detection engine 120 may transmit the information received from the digitizer sensor 108 to an application manager or a relevant application (e.g., application 136), such as an application stored in memory 134 of the host 128 and executable by a processor 132 of the host 128.

According to some exemplary implementations, the stylus 102 additionally includes a wireless communication unit 138, such as an auxiliary channel with Bluetooth communication, near field communication (NFC), radio frequency (RF) communication that communicates with the application(s) 136 of the host 128 for passing information between the stylus 102 and the host 128.

In one implementation, the stylus 102 does not include signal-emitting components in the writing tip 118. For example, the writing tip 118 may be made of one or more dielectrics, such as plastic, rubber, ceramics, etc. In this case, the stylus position detection engine 120 determines the position of the writing tip 118 using a relative angle detection element also included in the stylus. As used herein, the term "relative angle detection element" refers to an element of the stylus 102 that provides the digitizer sensor 108 with information for determining an angle of the handheld device relative to the digitizer sensor. In one implementation, the relative angle detection element is a tilt sensor. For example, the stylus position detection engine 120 uses information from the tilt sensor and a detected position of the electrode 124 to calculate the position of the writing tip 118. In another implementation, the relative angle detection element is a second signal-emitting electrode (as shown and discussed below with respect to FIG. 3). For example, the stylus position detection engine 120 determines the position of the writing tip 118 based on detectable positions of two electrodes of the stylus 102 (e.g., the signal emitting electrode 124 and another electrode (not shown)) and a known separation between the two electrodes along a longitudinal axis of the stylus 102 (e.g., using similar triangles based on orientation relative to the digitizer sensor 108 to solve for a position of the writing tip 118). A few example embodiments are disclosed with respect to FIGS. 2 and 3, below.

Figure 2:
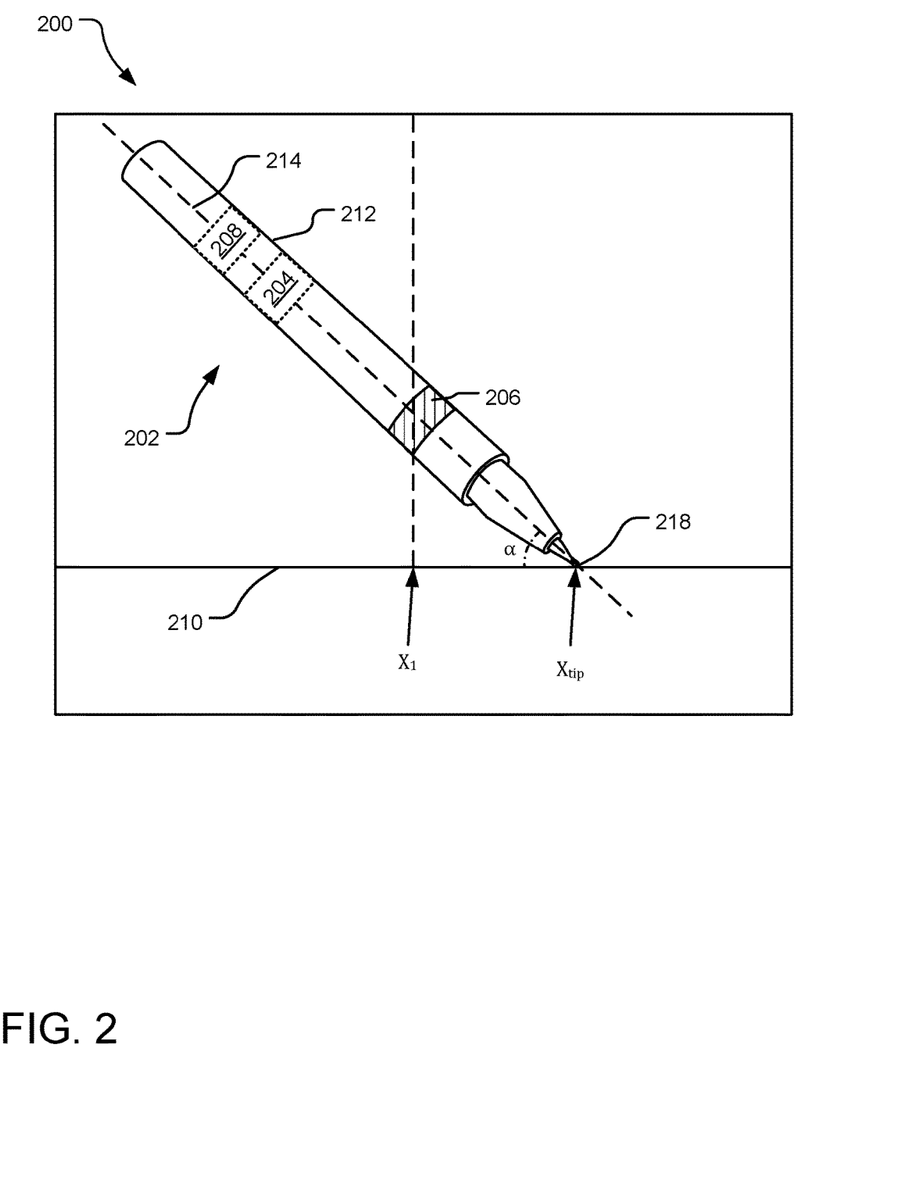
FIG. 2 illustrates an example system including a stylus for use with a stylus-enabled computing device including a digitizer sensor.

FIG. 2 illustrates an example system 200 including a stylus 202 for use with a stylus-enabled computing device including a digitizer sensor 210. The stylus 202 includes a housing 212 formed around a number of electrical components including, for example, an integrated circuit (IC) 204 that generates a position signal for transmission from a signal-emitting electrode 206 of the stylus 202 to the digitizer sensor 210. The signal is, for example, usable by the digitizer sensor 210 to compute a current position of the writing tip 218.

Notably, the signal-emitting electrode 206 is not positioned at or within the writing tip 218 of the stylus 202. Rather, the signal-emitting electrode 206 is electrically coupled to the IC 204 and separated from a writing tip 218 of the stylus along a primary (e.g., longitudinal) axis 214 of the stylus 202. In some implementations, the writing tip 218 is not electrically coupled to the IC 204 and is not configured for transmission of the position signal. For example, the writing tip 218 may be constructed fully or partially from one or more dielectric materials, such as a plastic, rubber, porcelain, glass, etc. In one implementation, the writing tip 218 is constructed entirely of dielectric material.

The signal-emitting electrode 206 is, in FIG. 2, shown to be annular in shape and formed about a circumference of the stylus 202 so as to form a portion of an exterior surface of the housing 212. For example, the signal-emitting electrode 206 is a conductive ring encircling the housing 212 or formed integrally with the housing 212 of the stylus 202. A number of electrode dimensions may be suitable; however, one suitable example signal-emitting electrode 206 is a few millimeters in diameter and very thin. Position detection may be more accurate if the signal-emitting electrode is placed in a region the user is unlikely to touch when utilizing the stylus 202.

If the signal-emitting electrode 206 is annular in shape, the emitted signals are not affected by rotation of the stylus 202 relative to the digitizer sensor 210, which simplifies tip position calculation. However, a variety of non-annular shapes may also be suitable, provided that the system 200 implements mechanisms to correct for observed signal variances due to rotation of the stylus 202. In some implementations, the signal-emitting electrode 206 is formed below the housing 212 of the stylus 202 instead of exterior to the housing 212, as shown.

In addition to the signal-emitting electrode 206 and the IC 204, the stylus 202 further includes a tilt sensor 208 for detecting a tilt of the stylus 202 relative to a plane, such as an x-y coordinate plane of the digitizer sensor 210 and/or a ground plane of the earth. The tilt sensor 208 is one example of a relative angle detection element and may take on any one of a number of suitable forms including without limitation that of a tilt switch, rolling ball sensor, mercury switch, accelerometer, etc. In different implementations, information collected by the tilt sensor 208 is transmitted to the stylus-enabled computing device in various ways. In one implementation, the IC 204 encodes information sensed by the tilt sensor 208 onto a signal transmitted by the signal-emitting electrode 206 and received by the digitizer sensor 210. In another implementation, the stylus 202 transmits tilt information sensed by the tilt sensor 208 on a separate burst signal. For example, the information from the tilt sensor 208 may be transmitted back to the stylus-enabled computing device using a wireless communication unit (not shown) further included within the housing 212.

A stylus position detection engine (not shown) of the stylus-enabled computing device determines a position of the writing tip 218 by detecting a position of the signal-emitting electrode 206 and uses this position in conjunction with data from the tilt sensor 208 to calculate the coordinates of the writing tip 218 on the digitizer sensor 210. For example, a relative position of the signal-emitting electrode 206 may be determined by analyzing a strength and detected location of an electrical coupling between the signal-emitting electrode 206 and one or more electrodes of the digitizer sensor 210. Further, data from the tilt sensor 208 may be usable to identify an angle ($\propto$) of the stylus relative to the digitizer sensor 210. For example, the position of the writing tip 218 is given by the following:

$$x_{tip} = x_1 - A^*(\cos(\propto)) \quad (1)$$

where $x_{tip}$ is the position of the writing tip 218 projected onto a coordinate system of the digitizer sensor 210; $x_1$ is the position of the signal-emitting electrode 206 projected onto the coordinate system of the digitizer sensor 210 (as shown); alpha ($\propto$) represents an offset angle between a longitudinal axis 214 of the stylus 202 and the digitizer sensor 210; and 'A' is the separation between $x_{tip}$ and $x_1$ along the longitudinal axis 214 of the stylus 202. Using equation (1) (above) for extracting the writing tip 218 facilitates greater flexibility in design for the writing tip 218. For example, the writing tip 218 may assume a number of different shapes and sizes and/or be interchangeably replaced by a user without disrupting (e.g., repositioning or altering) the electrical components used to generate and transmit the position signal, such as the IC 204, the electrode 206, or the connections between the two.

In one implementation, the IC 204 further includes a mechanism for sensing a type of writing tip currently attached to the stylus 202. For example, the IC 204 may be configured to recognize which of a number of different, interchangeable writing tips is currently-attached to the stylus 202 and to send an identifier to the stylus position detection engine of the stylus-enabled computing device. In this case, the stylus position detection engine may, for example use the received identifier to look up or otherwise compute dimensions of the writing tip 218 and use this information in computing the position of the writing tip 218.

Figure 3:
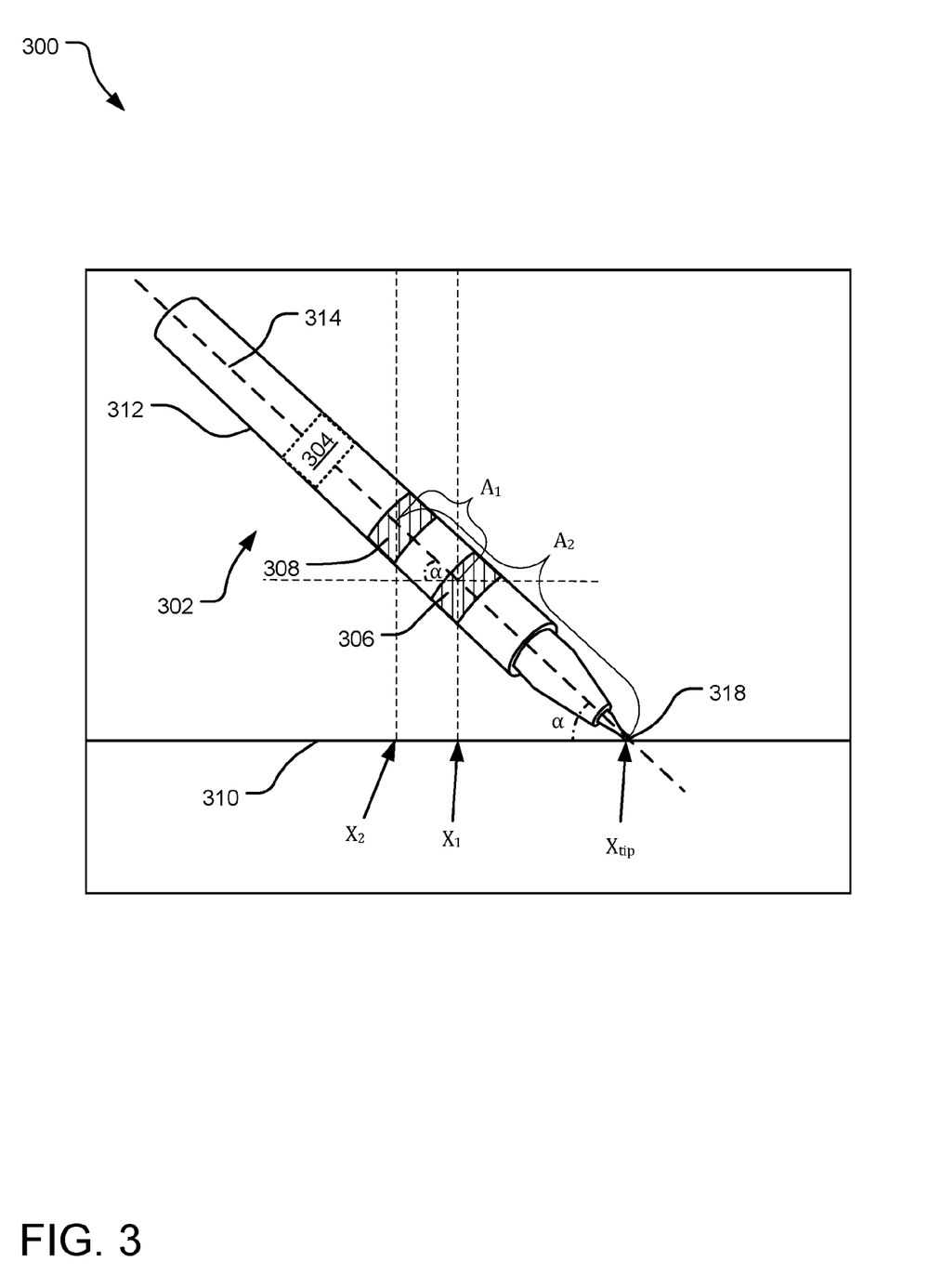
FIG. 3 illustrates another example system including a stylus for use with a digitizer sensor of a stylus-enabled computing device.

FIG. 3 illustrates another example system 300 including a stylus 302 for use with a digitizer sensor 310 of a stylus-enabled computing device 310. The stylus 302 includes a housing 312 and two electrodes (e.g., a first electrode 306 and a second electrode 308). In different implementations, the first electrode 306 and/or second electrode 308 may assume different shapes, sizes, and positions. However, in FIG. 3, both the first electrode 306 and the second electrode 308 are conductive, annular-shaped components encircling the longitudinal axis 314 of the stylus 302 and forming a part of the outer-surface of the housing 312. In other implementations, the first electrode 306 and/or the second electrode 308 may be non-annular in shape and/or formed below the outer surface of the housing 312, such as when the outer surface of the housing 312 is non-conductive and therefore unlikely to interfere with the electrode signals.

An integrated circuit (IC) 304 is positioned within the housing 314 and operable to generate signals for transmission via the first electrode 306 and the second electrode 308 to the digitizer sensor 310. The signals transmitted from the first electrode 306 and the second electrode 308 are, in one implementation, independently detectable by the digitizer sensor 310. For example, the two transmitted signals cause electrostatic coupling at two discrete and detectable locations of the digitizer sensor 310. In another implementation, the two transmitted signals are of and independently detectable frequencies and/or include different encoded information. Signals transmitted by the electrodes 306 and 308 are therefore useable to positively determine the positions of each one of the electrodes 306 and 308 relative to the coordinate system of the digitizer sensor 310.

The electrodes 306 and 308 are separated from one another and also separated from a writing tip 318 of the stylus 302 along the longitudinal axis 314 of the stylus 302. In one implementation, the writing tip 318 is not electrically coupled to the IC 304 and is not configured for signal transmission. For example, the writing tip 318 may be constructed fully or partially from one or more dielectric materials, such as a plastic, rubber, porcelain, glass, etc. In one implementation, the writing tip 318 is constructed entirely of dielectric material.

When the positions of each of the two electrodes 306 and 308 are determined relative to a coordinate system of the digitizer sensor 310, a position of the writing tip 318 can be extracted without using tilt sensor or other sensor information. For example, as illustrated in FIG. 3, similar triangles can be used to define a cosine of an angle ($\propto$) as follows:

$$\cos(\propto) = \frac{(x_2 - x_{tip})}{A_2} = \frac{(x_2 - x_1)}{A_1} \quad (2)$$

where $A_1$ and $A_2$ represent hypotenuses of similar triangles (as shown); $x_{tip}$ is the position of the writing tip 318 projected onto the coordinate system of the digitizer sensor 310; $x_2$ is the position of the electrode 308 projected onto the coordinate system of the digitizer sensor 310; and $x_1$ is the position of the electrode 306 projected onto the coordinate system of the digitizer sensor 310. In the illustrated implementation, the position of the writing tip 318 can therefore be determined by solving equation (2) (above) for $x_{tip}$. Since the position of the writing tip 318 and/or the relative angle ($\propto$) between the stylus 302 and the digitizer sensor 310 can be determined from equation (2), above, the second electrode 308 is, like the tilt sensor of FIG. 2, also referred to herein as a relative angle detection element.

Thus, by using two electrodes (e.g., 306 and 308) as shown, the position of the writing tip 318 can be calculated without using additional sensor positioning or orientation information. For example, the position of the writing tip 318 can be determined without use of a tilt sensor or any other supplemental sensors that may be included within the housing 314. Like the implementation of FIG. 2, the implementation of FIG. 3 provides design flexibility for the construction of the writing tip 318. In various implementations, the writing tip 318 may assume a number of different shapes and sizes and/or be interchangeably replaced by a user without disrupting (e.g., repositioning or altering) the electrical components used to generate and transmit position signal information.

Figure 4:
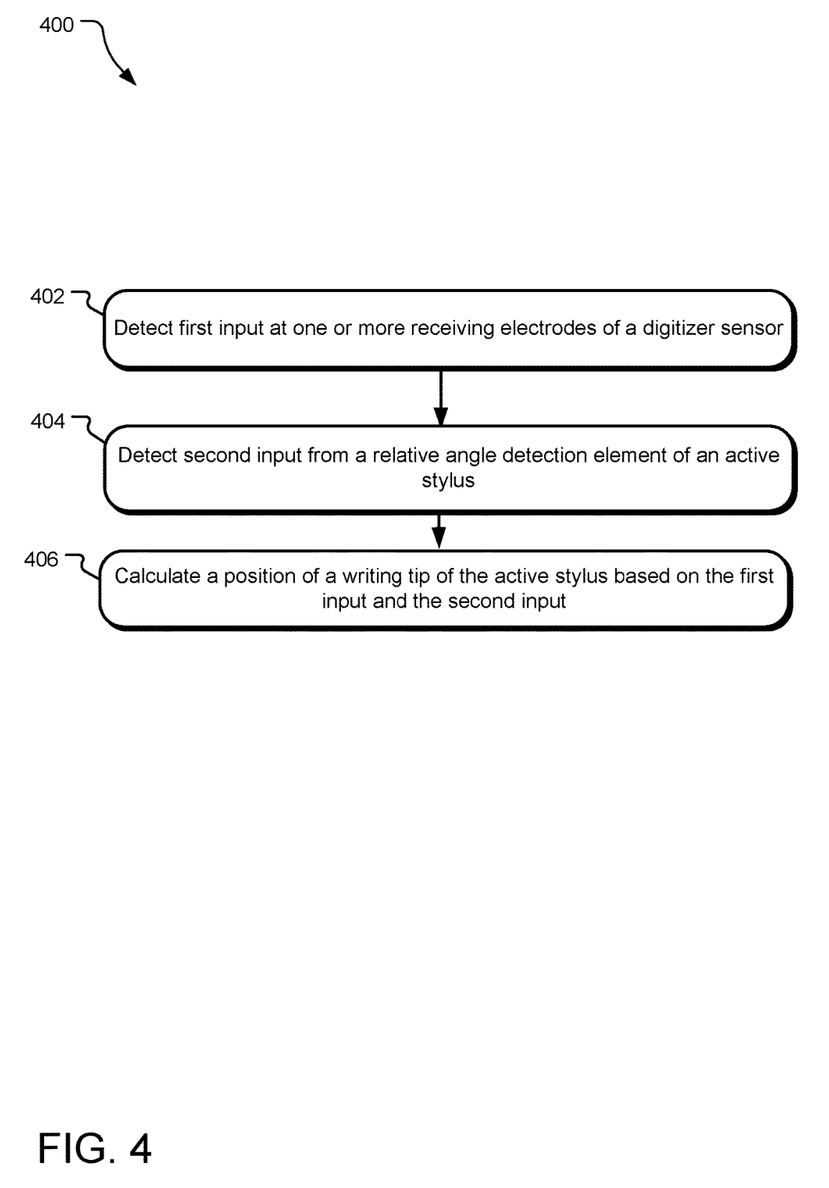
FIG. 4 illustrates example operations for using a digitizer sensor to track position of an active stylus with a non-conductive writing tip.

FIG. 4 illustrates example operations 400 for position tracking of an active stylus that does not include a signal-emitting electrode within a writing tip. A first detection operation 402 detects a first input at one or more electrodes of a digitizer sensor. For example, the digitizer sensor may be embedded beneath the exterior surface of a display, such as a display included in a tablet, mobile phone, or other display device. The detected first input is, in one implementation, in the form of a signal emitted by a first signal-emitting electrode within the active stylus and separated from a writing tip along a longitudinal axis of the active stylus.

A second detecting operation 404 detects a second input from a relative angle detection element of the active stylus. The second input provides information usable to determine an angle of the active stylus relative to the digitizer sensor. For example, the second input may include tilt sensor information collected by a tilt sensor of the active stylus. In this case, the tilt sensor information and a position of the one or more receiving electrodes can, together, be used to calculate a position of the writing tip. In other implementation, the second input is a signal transmitted by a second signal-emitting electrode of the active stylus that is detected by other receiving electrodes at the digitizer sensor. For example, the second signal-emitting electrode is separated from the first signal-emitting electrode and the writing tip of the active stylus along a longitudinal axis of the stylus and signals transmitted by the first and second signal-emitting electrodes provide relative position information usable for calculating a position of the writing tip.

A calculating operation 406 calculates the position of the writing tip of the active stylus based on the position(s) of the one or more receiving electrodes that receive the first input and the second input from the relative angle detection element. In one implementation, the extraction operation 406 extracts the position of the writing tip using information from a tilt sensor in conjunction with position information for the first signal-emitting electrode relative to the digitizer sensor (e.g., as described with respect to FIG. 2). In another implementation, the calculation operation 406 calculates the position of the writing tip without using a tilt sensor, such as by using a known separation between two signal-emitting electrodes and the positions of multiple receiving electrodes of the digitizer sensor that electrically couple with the two signal-emitting electrodes (e.g., as described with respect to FIG. 3).

Figure 5:
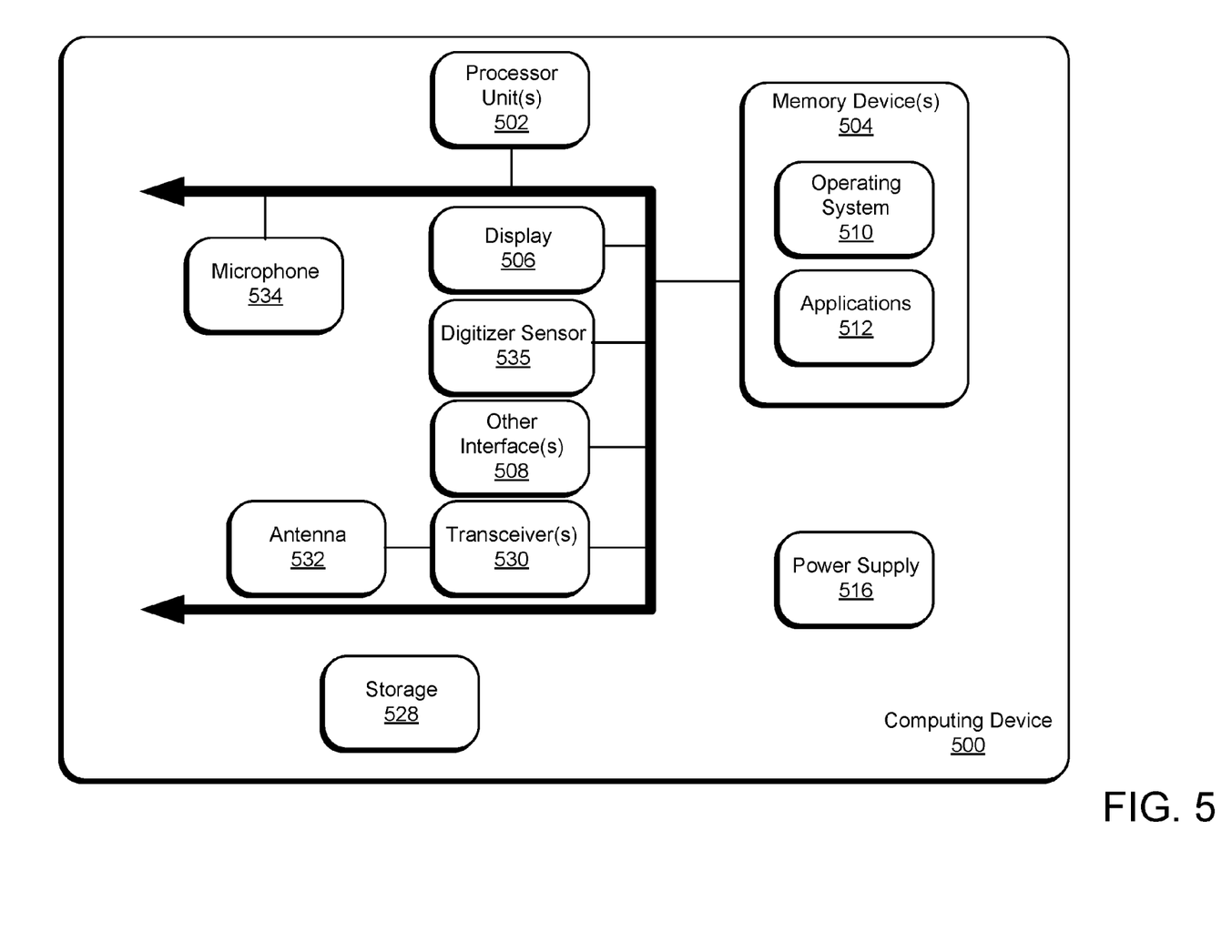
FIG. 5 illustrates an example schematic of a computing device suitable for position-tracking of an active stylus with a non-conductive tip.

FIG. 5 illustrates an example schematic of a processing device 500 suitable for determining coordinates of a writing tip of a handheld device accessory, such as an active stylus, according to the herein described technology. The example computing device 500 includes one or more processor units 502, one or more memory devices 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 512, such as a stylus position detection engine are loaded in the memory device 504 and executed on the operating system 510 by the processor(s) 502. The applications 512 may receive input from the display 506 and/or a digitizer sensor 535 embedded within or beneath the display 512. The example computing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 530 and an antenna 532 to provide network connectivity (e.g., a mobile phone network, Wi-Fi®, BlueTooth®, etc.). The computing device 500 may also include various other components, such as a positioning system (e.g., a global positioning satellite transceiver), one or more accelerometers, one or more cameras, an audio interface (e.g., a microphone 534, an audio amplifier and speaker and/or audio jack), and additional storage 528. Other configurations may also be employed.

In an example implementation, a mobile operating system, various applications (including a stylus position detection engine) and other modules and services may be embodied by instructions stored in memory 504 and/or storage devices 528 and processed by the processing unit(s) 502. The memory 504 may be memory of host device or of an accessory that couples to a host. Some or all aspects of the stylus position detection engine described with respect to FIGS. 1-4, above, may be saved in memory of one or more of a host device, display accessory (e.g., touchscreen accessory including a digitizer sensor), or a handheld writing accessory (e.g., the active stylus). Likewise, some or all aspects of the stylus position detection engine may be executable by any one or more of a host device, display accessory, or a handheld writing accessory (e.g., the active stylus interacting with the display accessory).

The computing device 500 may include a variety of tangible computer-readable storage media and intangible computer-readable communication signals. Tangible computer-readable storage can be embodied by any available media that can be accessed by the speech recognition device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the speech recognition device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

A handheld device for use with a digitizer sensor includes a writing tip, an integrated circuit configured to generate a signal, and a first electrode. The first electrode is separated from the writing tip along a longitudinal axis of the handheld device, electrically coupled to the integrated circuit, and configured to transmit the signal to the digitizer sensor. The handheld device further includes a relative angle detection element configured to provide position information for determining an angle of the handheld device relative to the digitizer sensor. The position information is usable to calculate a position of the writing tip relative to the digitizer sensor.

In another example device of any preceding device, the writing tip is not configured to emit a signal.

In another example device of any preceding device, the first electrode is a conductive ring encircling the longitudinal axis and exposed on an exterior surface of the handheld device.

In another example device of any preceding device, the relative angle detection element includes a tilt sensor, wherein the integrated circuit is further configured to encode information sensed by the tilt sensor on the signal.

In another example device of any preceding device, the relative angle detection element includes a second electrode coupled to the integrated circuit and separated from the first electrode and the writing tip by a distance along the longitudinal axis of the handheld device.

In still another example device of any preceding device, the first electrode and the second electrode are both conductive rings encircling the longitudinal axis of the handheld device.

In still yet another example device of any preceding device, the first electrode and the second electrode are both exposed on an exterior surface of the handheld device.

A method for detecting a position of writing tip of a handheld device includes detecting first input at one or more receiving electrodes of a digitizer sensor included in an electronic display, where the detected first input is transmitted by a first signal-emitting electrode of the handheld device that is separated from a writing tip of the handheld device by a distance along a longitudinal axis of the handheld device. The method further includes detecting second input from a relative angle detection element of the handheld device, and calculating a position of the writing tip of the handheld device relative to the digitizer sensor based on a position of the one or more receiving electrodes of the digitizer sensor and the second input.

In an example method of any preceding method, the first signal-emitting electrode is a conductive ring encircling the longitudinal axis and exposed on an exterior surface of the handheld device.

In another example method of any preceding method, the relative angle detection element includes a tilt sensor and the method further comprises receiving tilt information collected by the tilt sensor of the handheld device, wherein calculating the position of the writing tip is further based on the tilt information.

In another example method of any preceding method, the relative angle detection element includes a second signal-emitting electrode separated from both the first signal-emitting electrode and the writing tip by a distance along the longitudinal axis of the handheld device. In this method, calculating the position of the writing tip further comprises calculating the position of the writing tip based on detected positions of the first signal-emitting electrode and the second signal-emitting electrode relative to the digitizer sensor.

In another example method of any preceding method, the writing tip is non-conductive.

In another example method of any preceding method, the first signal-emitting electrode and the second signal-emitting electrode are both conductive rings encircling the longitudinal axis and exposed on an exterior surface of the handheld device.

In yet another example method of any preceding method, the handheld device is a stylus.

An example system for detecting a position of writing tip of a handheld device includes a means for detecting first input at one or more receiving electrodes of a digitizer sensor included in an electronic display, where the detected first input is transmitted by a first signal-emitting electrode of the handheld device that is separated from a writing tip of the handheld device by a distance along a longitudinal axis of the handheld device. The method further includes a means for detecting second input from a relative angle detection element of the handheld device, and a means for calculating a position of the writing tip of the handheld device relative to the digitizer sensor based on a position of the one or more receiving electrodes of the digitizer sensor and the second input.

A system comprises at least one memory device, at least one processing device, and a stylus position detection engine stored in the memory and executable by the processor to receive first input from a digitizer sensor indicating a position of one or more signal-receiving electrodes of the digitizer sensor interacting with a first signal-emitting electrode of a handheld device including a writing tip, where the first signal-emitting electrode is separated from the writing tip by a distance along a longitudinal axis of the handheld device. The stylus position detection engine is further executable to receive second input from a relative angle detection element of the handheld device, and to calculate a position of a writing tip of the handheld device relative to the digitizer sensor based on the position of the one or more receiving electrodes of the digitizer sensor and the second input.

In another example system of any preceding system, the first signal-emitting electrode is a conductive ring encircling the longitudinal axis and exposed on an exterior surface of the handheld device.

In another example system of any preceding system, the relative angle detection element includes a tilt sensor within the handheld device and the stylus position detection engine is further executable to calculate the position of the writing tip based on information received from the tilt sensor.

In another example system of any preceding system, the relative angle detection element includes a second signal-emitting electrode separated from both the first signal-emitting electrode and the writing tip by a distance along the longitudinal axis of the handheld device, and calculating the position of the writing tip is further based on a determined position of the first signal-emitting electrode and the second signal-emitting electrode relative to the digitizer sensor.

In another example system of any preceding system, the writing tip is non-conductive.

In still another example system of any preceding system, the first signal-emitting electrode and the second signal-emitting electrode are both conductive rings encircling the longitudinal axis and exposed on an exterior surface of the handheld device.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A system comprising:
    at least one memory device;
    at least one processing device;
    a stylus position detection engine stored in the memory and executable by the processor to:
        receive first input from a digitizer sensor indicating a position of one or more signal-receiving electrodes of the digitizer sensor interacting with a first signal-emitting electrode of a handheld device including a writing tip, the first signal-emitting electrode separated from the writing tip by a distance along a longitudinal axis of the handheld device;
        receive second input from a relative angle detection element of the handheld device;
        calculate a position of a writing tip of the handheld device relative to the digitizer sensor based on the position of the one or more receiving electrodes of the digitizer sensor and the second input.

2. The system of claim 1, wherein the first signal-emitting electrode is a conductive ring encircling the longitudinal axis and exposed on an exterior surface of the handheld device.

3. The system of claim 1, wherein the relative angle detection element includes a tilt sensor within the handheld device and the stylus position detection engine is further executable to calculate the position of the writing tip based on information received from the tilt sensor.

4. The system of claim 1, wherein the relative angle detection element includes a second signal-emitting electrode separated from both the first signal-emitting electrode and the writing tip by a distance along the longitudinal axis of the handheld device, and wherein calculating the position of the writing tip is further based on a determined position of the first signal-emitting electrode and the second signal-emitting electrode relative to the digitizer sensor.

5. The system of claim 4, wherein the writing tip is non-conductive.

6. The system of claim 5, wherein the first signal-emitting electrode and the second signal-emitting electrode are both conductive rings encircling the longitudinal axis and exposed on an exterior surface of the handheld device.

7. A handheld device for use with a digitizer sensor, the handheld device comprising:
- a writing tip;
- an integrated circuit configured to generate a signal;
- a first electrode separated from the writing tip along a longitudinal axis of the handheld device, the first electrode electrically coupled to the integrated circuit and configured to transmit the signal to the digitizer sensor; and
- a relative angle detection element configured to provide position information for determining an angle of the handheld device relative to the digitizer sensor, the position information usable to calculate a position of the writing tip relative to the digitizer sensor.

8. The handheld device of claim 7, wherein the writing tip is not configured to emit a signal.

9. The handheld device of claim 7, wherein the first electrode is a conductive ring encircling the longitudinal axis and exposed on an exterior surface of the handheld device.

10. The handheld device of claim 7, wherein the relative angle detection element includes a tilt sensor, wherein the integrated circuit is further configured to encode information sensed by the tilt sensor on the signal.

11. The handheld device of claim 7, wherein the relative angle detection element includes a second electrode coupled to the integrated circuit and separated from the first electrode and the writing tip by a distance along the longitudinal axis of the handheld device.

12. The handheld device of claim 11, wherein the first electrode and the second electrode are both conductive rings encircling the longitudinal axis of the handheld device.

13. The handheld device of claim 7, wherein the first electrode and the second electrode are both exposed on an exterior surface of the handheld device.

14. A method comprising:
- detecting first input at one or more receiving electrodes of a digitizer sensor included in an electronic display, the detected first input transmitted by a first signal-emitting electrode of a handheld device that is separated from a writing tip of the handheld device by a distance along a longitudinal axis of the handheld device;
- detecting second input from a relative angle detection element of the handheld device;
- calculating a position of the writing tip of the handheld device relative to the digitizer sensor based on a position of the one or more receiving electrodes of the digitizer sensor and the second input.

15. The method of claim 14, wherein the first signal-emitting electrode is a conductive ring encircling the longitudinal axis and exposed on an exterior surface of the handheld device.

16. The method of claim 14, wherein the relative angle detection element includes a tilt sensor and the method further comprises:
- receiving tilt information collected by the tilt sensor of the handheld device, wherein calculating the position of the writing tip is further based on the tilt information.

17. The method of claim 14, wherein the relative angle detection element includes a second signal-emitting electrode separated from both the first signal-emitting electrode and the writing tip by a distance along the longitudinal axis of the handheld device, and wherein calculating the position of the writing tip further comprises calculating the position of the writing tip based on detected positions of the first signal-emitting electrode and the second signal-emitting electrode relative to the digitizer sensor.

18. The method of claim 17, wherein the writing tip is non-conductive.

19. The method of claim 17, wherein the first signal-emitting electrode and the second signal-emitting electrode are both conductive rings encircling the longitudinal axis and exposed on an exterior surface of the handheld device.

20. The method of claim 14, wherein the handheld device is a stylus.

* * * * *